United States Patent [19]

Nakamura

[11] Patent Number: 4,868,410
[45] Date of Patent: Sep. 19, 1989

[54] SYSTEM OF LOAD FLOW CALCULATION FOR ELECTRIC POWER SYSTEM

[75] Inventor: Shizuka Nakamura, Kohbe, Japan

[73] Assignee: Mitsubishi Denki Kabushiki Kaisha, Tokyo, Japan

[21] Appl. No.: 237,696

[22] Filed: Aug. 26, 1988

Related U.S. Application Data

[63] Continuation-in-part of Ser. No. 919,002, Sep. 10, 1986, abandoned.

[51] Int. Cl.$^4$ ................................................ H02J 3/18
[52] U.S. Cl. ...................................... 307/20; 307/24; 307/33; 323/205; 364/492
[58] Field of Search ........................ 307/20, 24, 31, 33; 364/492; 323/205

[56] References Cited

FOREIGN PATENT DOCUMENTS 106341  7/1982  Japan .

OTHER PUBLICATIONS

Despotovic, "A New Decoupled Load Flow Method", IEEE Transactions on Power App. and Syst., vol. 93, No. 3, pp. 859-869 (1974).

Stott et al., Fast Decoupled Load Flow, IEEE, PAS-93, No. 3, pp. 859-867, 1973.

*Primary Examiner*—William H. Beha, Jr.
*Attorney, Agent, or Firm*—Bernard, Rothwell & Brown

[57] ABSTRACT

In the load flow calculating method of the present invention, a Jacobian matrix for reactive power with respect to voltage is made to coincide with a part of a Jacobian matrix for effective power with respect to phase by introducing variables of the quotients of differences between effective power and reactive power flowing through each node and specified values divided by the square of voltage on each node, whereby the need for triangular factorization of the Jacobian matrix for reactive power with respect to voltage is eliminated, and, at the time of calculating a voltage correction amount, the voltage correction amount is compensated by the use of the product of a Jacobian matrix for reactive power with respect to phase and a vector of phase correction amount, and by virtue of the needlessness of triangular factorization of the Jacobian matrix for reactive power with respect to voltage and nonnecessity, at the time of calculating the voltage correction amount, for calculating discrepancy of reactive power newly flowing in through each node from a specified value, and so forth, a speed-up of the load flow calculating process becomes possible.

2 Claims, 5 Drawing Sheets

SYSTEM OF LOAD FLOW CALCULATION FOR ELECTRIC POWER SYSTEM

This is a continuation-in-part of application Ser. No. 919,002, filed Sept. 10, 1986, now abandoned.

TECHNICAL FIELD

The present invention relates to a method of load flow calculation in power control for an electric power system.

BACKGROUND ART

Figure 6:
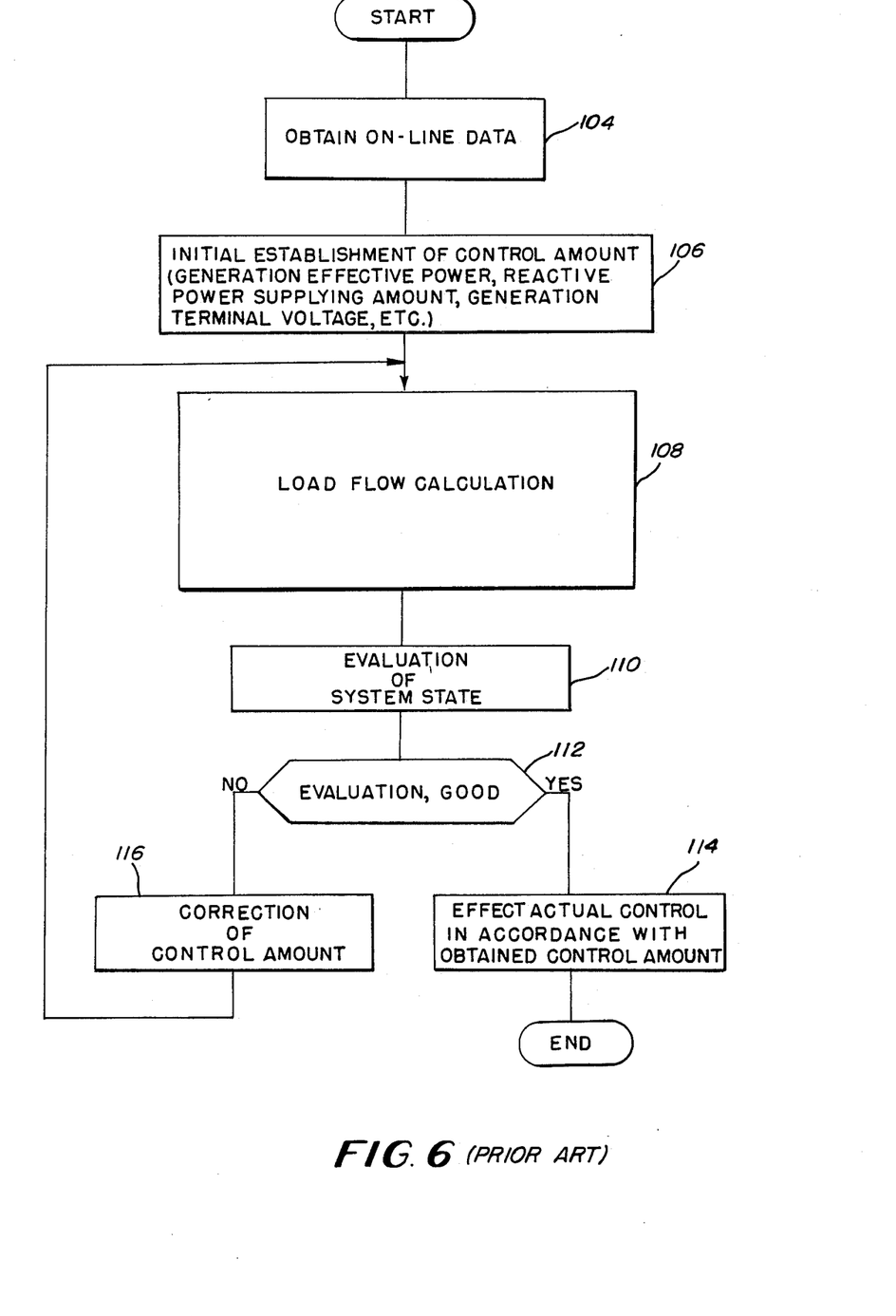
FIG. 6 is a flow chart showing the overall method of controlling an electric power system using one of the load flow calculation procedures of FIGS. 1, 2 or 5.

Control of a power supply system (voltage control, load flow control, etc.) has been performed in accordance with the process flow diagram of FIG. 6. In step 104, the various on-line data readings, i.e., voltages, power flows, etc., are obtained. In step 106, a proposed control amount, i.e., change in voltage, power injections, etc., is initially established. Then in step 108, load flow calculation is performed to determine the various power flows, voltages and phases that will be produced in the power system if the proposed control adjustment is performed. The results of the load flow calculations 108, are evaluated in step 110, and then in step 112, the program or process branches to either step 114 or step 116 depending upon whether the evaluation determines an acceptable or non-acceptable system. When the power system as determined by the load flow calculation 108 is non-acceptable, step 116 changes the control amount initially set in step 106 or later set in a previous step, and returns to the load flow calculation step 108. When the calculated power system in step 108 becomes acceptable, the step 114 makes the control amount correction to obtain optimum or correct operation of the power system. It is seen that it is necessary to perform the load flow calculation many times and therefore high-speed load flow calculation is necessary to provide corrections to meet changing power system conditions or to correct for an outage or failure.

Figure 1:
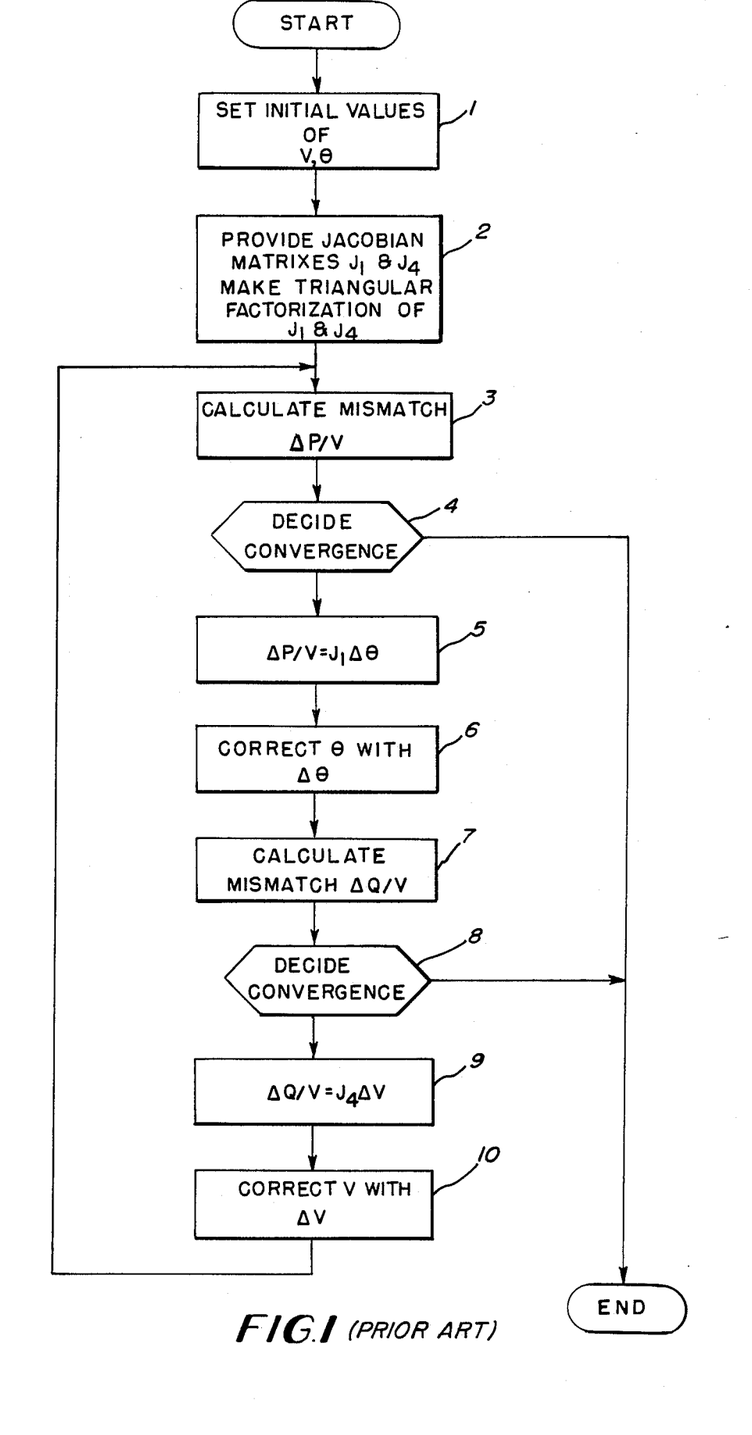
FIG. 1 is a flow chart of a load flow calculating system of a prior art.

FIG. 1 shows a flow chart of a load flow calculation by a prior art fast decoupled method as described, for example, in "Fast Decoupled Load Flow, IEEE PAS-93, No. 3, PP 859–867". Referring to the drawing, 1 denotes a block for determining initial values of voltage V and phase $\theta$ of each bus bar, 2 denotes a block for providing Jacobian matrix $J_1$ for effective power with respect to phase of the effective power and Jacobian matrix $J_4$ for reactive power with respect to voltage and making triangular factorization of $J_1$ and $J_4$, 3 denotes a block for providing, with V and $\theta$, effective power flowing in through each node, obtaining the difference $\Delta P$ between this value and the specified value of the inflow effective power for each node, and in succession thereto calculating $\Delta P/V$ by dividing $\Delta P$ for each node by V on each node, 4 denotes a block for deciding convergence, 5 denotes a block for solving a linear equation $\Delta P/V = J_1 \Delta\theta$ with $\Delta P/V$ obtained in the block 3 and the result of the triangular factorization of $J_1$ obtained in the block 2 thereby to obtain a correction value $\Delta\theta$ of the phase, 6 denotes a block for correcting $\theta$ with $\Delta\theta$, 7 denotes a block for providing, with V and $\theta$, reactive power flowing in through each node, obtaining the difference $\Delta Q$ between this value and the specified value of the inflow reactive power for each node, and in succession thereto calculating $\Delta Q/V$ by dividing $\Delta Q$ for each node by V on each node, 8 denotes a block for deciding convergence, 9 denotes a block for solving a linear equation $\Delta Q/V = J_4 \Delta V$ with $\Delta Q/V$ obtained in the block 7 and the result of the triangular factorization of $J_4$ obtained in the block 2 thereby to obtain a correction value $\Delta V$ of the voltage, and 10 denotes a block for correcting V with $\Delta V$.

In the prior art calculating method, it was necessary to make triangular factorization of each of the Jacobian matrixes $J_1$ and $J_4$ in the block 2 of FIG. 1 and therefore required large calculating volume.

DISCLOSURE OF THE INVENTION

The present invention, in a load flow calculation for a power system discloses, a load flow calculating system characterized in that a Jacobian matrix for reactive power is therein made to coincide with a part of a Jacobian matrix for effective power by introducing variables representing the quotients of discrepancies of the effective power and the reactive power flowing in through each node from specified values divided by the square of the voltage on each node, and thereby, triangular factorization of the Jacobian matrixes can be finished in one time of factorization. And therefore, the need for the triangular factorization of the Jacobian matrix $J_4$ is eliminated and a speed-up of the process is made possible.

BEST MODE FOR CARRYING OUT THE INVENTION

An improved load flow calculation procedure for use in the control of a power system in accordance with FIG. 6 and the present invention will be described with reference to FIG. 2 below. Since those denoted by 1, 4, 6, 8, and 10 in FIG. 2 are identical to the blocks denoted by identical reference numerals in FIG. 1, other blocks than those will be described in the following.

Figure 2:
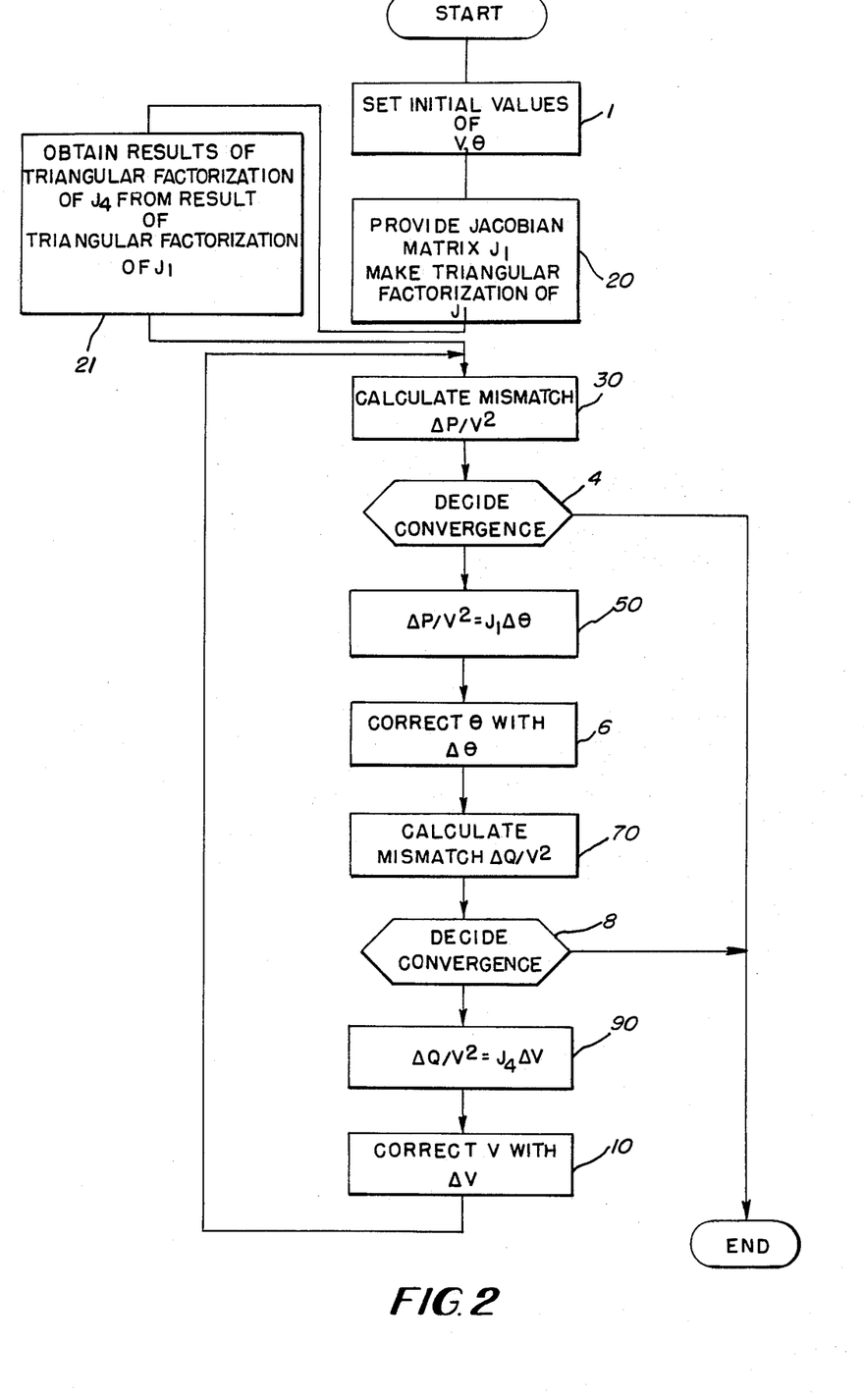
FIG. 2 is a flow chart showing an embodiment of the load flow calculating system according to the present invention.

Referring to FIG. 2, 20 denotes a block for providing Jacobian matrix $J_1$ with respect to phase of effective power, which is different from $J_1$ in FIG. 1, and making triangular factorization of the thus provided $J_1$, 21 denotes a block for obtaining triangular factorization result of $J_4$ from triangular factorization result of $J_1$, 30 denotes a block for providing, with V and $\theta$, effective power flowing in through each node, obtaining the difference $\Delta P$ between this value and the specified value of the inflow effective power for each node, and in succession thereto calculating $\Delta P/V^2$ by dividing $\Delta P$ for each node by the square of the voltage V on each node, 50 denotes a block for solving a linear equation $\Delta P/V^2 = J_1 \Delta\theta$ with $\Delta P/V^2$ obtained in the block 30 and the result of the triangular factorization of $J_1$ obtained in the block 20 thereby to obtain $\Delta\theta$, 70 denotes a block for providing, with V and $\theta$, reactive power flowing in through each node, obtaining the difference $\Delta Q$ between this value and the specified value of the inflow reactive power for each node, and in succession thereto calculating $\Delta Q/V^2$ by dividing $\Delta Q$ for each node by the square of the voltage V on each node, 90 denotes a block for solving a linear equation $\Delta Q/V^2 = J_4\Delta V$ with $\Delta Q/V^2$ obtained in the block 70 and the result of the triangular factorization of $J_4$ obtained in the block 21 thereby to obtain $\Delta V$.

Prior to detailed description of the algorithm for the embodiment to be given in the following, functional forms of mismatch functions $\Delta P$ and $\Delta Q$ in the load flow calculation will be given below.

$$\Delta Pi(\theta, V) = \sum_j \left( \frac{X_{ij} V_i V_j}{R_{ij}^2 + X_{ij}^2} \sin(\theta_i - \theta_j) + \frac{R_{ij} V_i}{R_{ij}^2 + X_{ij}^2} (V_i - V_j \cos(\theta_i - \theta_j)) \right) + G_i V_i^2 - P_{set\ i} \quad (1)$$

$$\Delta Qi(\theta, V) = \sum_j \left( \frac{-R_{ij} V_i V_j}{R_{ij}^2 + X_{ij}^2} \sin(\theta_i - \theta_j) + \frac{X_{ij} V_i}{R_{ij}^2 + X_{ij}^2} (V_i - V_j \cos(\theta_i - \theta_j)) \right) - B_i V_i^2 - Q_{set\ i} \quad (2)$$

where
- j: node number of adjacent node to node i connected therewith by way of a branch
- Rij, Xij: resistance and reactance of the branch connecting node i with node j
- Vi, Vj: voltages of node i and node j, respectively
- $\theta_i$, $\theta_j$: phases of node i and node j, respectively
- Gi, Bi: conductance and susceptance to ground of node i
- Pset i, Qset i: specified values of effective power and reactive power flowing in through node i from outside the system The load flow calculation is to find $\theta$ and V which satisfy the following equations with respect to all of the nodes i.

$$\Delta Pi(\theta, V) = 0 \quad (3)$$

$$\Delta Qi(\theta, V) = 0 \quad (4)$$

Here, new mismatch functions p and q which are used in the present invention are defined anew.

$$p_i = \Delta Pi(\theta, V)/V_i^2 \quad (5)$$

$$q_i = \Delta Qi(\theta, V)/V_i^2 \quad (6)$$

By partially differentiating pi and qi with respect to $\theta$ and V, respectively, and introducing the following approximations, we obtain Jacobian matrixes $J_1$ and $J_4$ as shown in the block 20 in FIG. 2.

(Approximations in obtaining Jacobian matrixes $J_1$ and $J_4$.)

(1) It is made such that Qset i, in the convergence calculation, is approximately supplied by susceptance to ground Qsi. Qset i=Qsi(n)·Vi²(n), where n is the number of repeated calculations.

(2) Vi=Vj=1.0, $\theta_i - \theta_j = 0$. Elements of Jacobian matrix $J_1$ are given by equations (7) and (8).

$$\frac{\partial P_i}{\partial \theta_i} = \sum_j \frac{X_{ij}}{R_{ij}^2 + X_{ij}^2} \quad (7)$$

$$\frac{\partial P_i}{\partial \theta_j} = -\frac{X_{ij}}{R_{ij}^2 + X_{ij}^2} \quad (8)$$

Elements of Jacobian matrix $J_4$ are given by equations (9) and (10).

$$\frac{\partial q_i}{\partial V_i} = \sum_j \frac{X_{ij}}{R_{ij}^2 + X_{ij}^2} \quad (9)$$

$$\frac{\partial q_i}{\partial V_j} = -\frac{X_{ij}}{R_{ij}^2 + X_{ij}^2} \quad (10)$$

Figure 3:
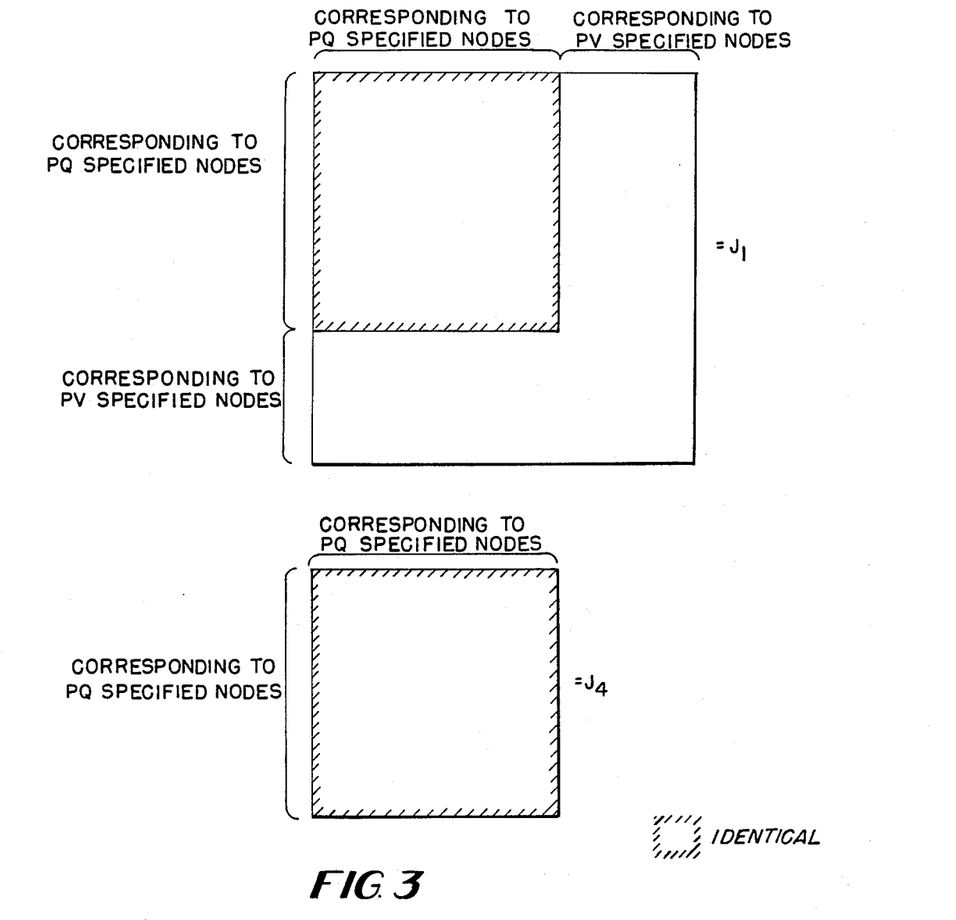
FIG. 3 is an explanatory drawing showing structures of Jacobian matrixes in the present invention.
Figure 4:
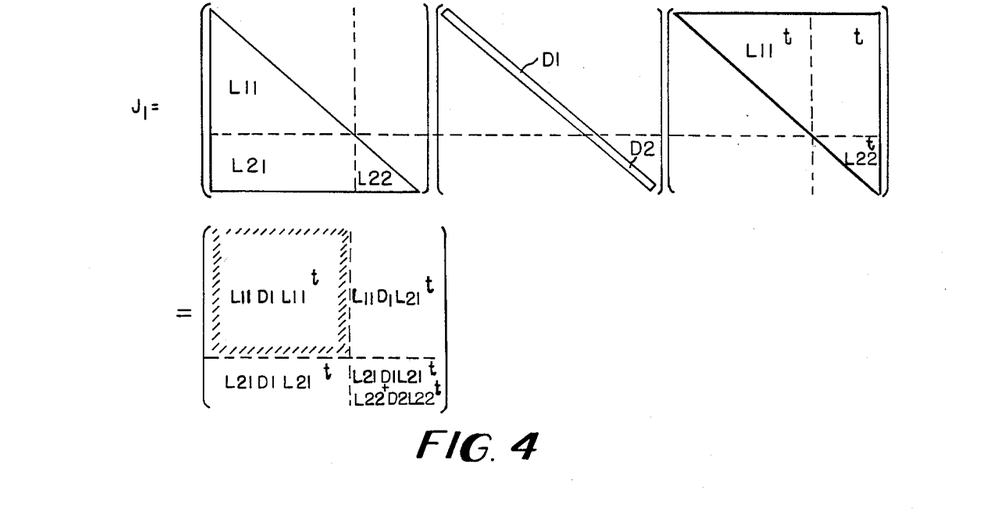
FIG. 4 is an explanatory drawing of the method for finishing triangular factorization of the Jacobian matrixes of FIG. 3 in one time of factorization.

From above, it is known that the matrix $J_1$ and the matrix $J_4$ have the parts of identical forms. The present invention utilizing this characteristic obtains the result of triangular factorization of $J_4$ at the same time as triangular factorization of $J_1$ is made and thereby achieves a speed-up of the processing. Description as to the system enabling the triangular factorization to be finished in one time will be given in the following. In the present invention, node numbers are assigned to PQ specified nodes (nodes for which both the inflow effective power value and the inflow reactive power value are specified) and PV specified nodes (nodes for which the inflow effective power value and the node voltage are specified) in the order mentioned, and thereby, the structure of Jacobian matrix as shown in FIG. 3 is provided. If, in succession thereto, $J_1$ is subjected to $LDL^t$ factorization, since $J_4$ is identical to the partial matrix of $J_1$ surrounded by the oblique lines in FIG. 4, $J_4$ coincides with $L_{11}D_1L_{11}^t$ in FIG. 4 as the result of the $LDL^t$ factorization, and the same is thus automatically obtained in the process of $LDL^t$ factorization of $J_1$, and therefore, the need for $LDL^t$ factorization of $J_4$ can be eliminated.

Although an embodiment of the present invention was described in the above in a form of variation of the fast decoupled method, the essential point of the invention is to have the triangular factorization of Jacobian matrixes finished in one time of factorization by making the Jacobian matrix for reactive power with respect to voltage identical to a part of the Jacobian matrix for effective power with respect to phase, and this system is applicable to many other load flow calculations.

Figure 5:
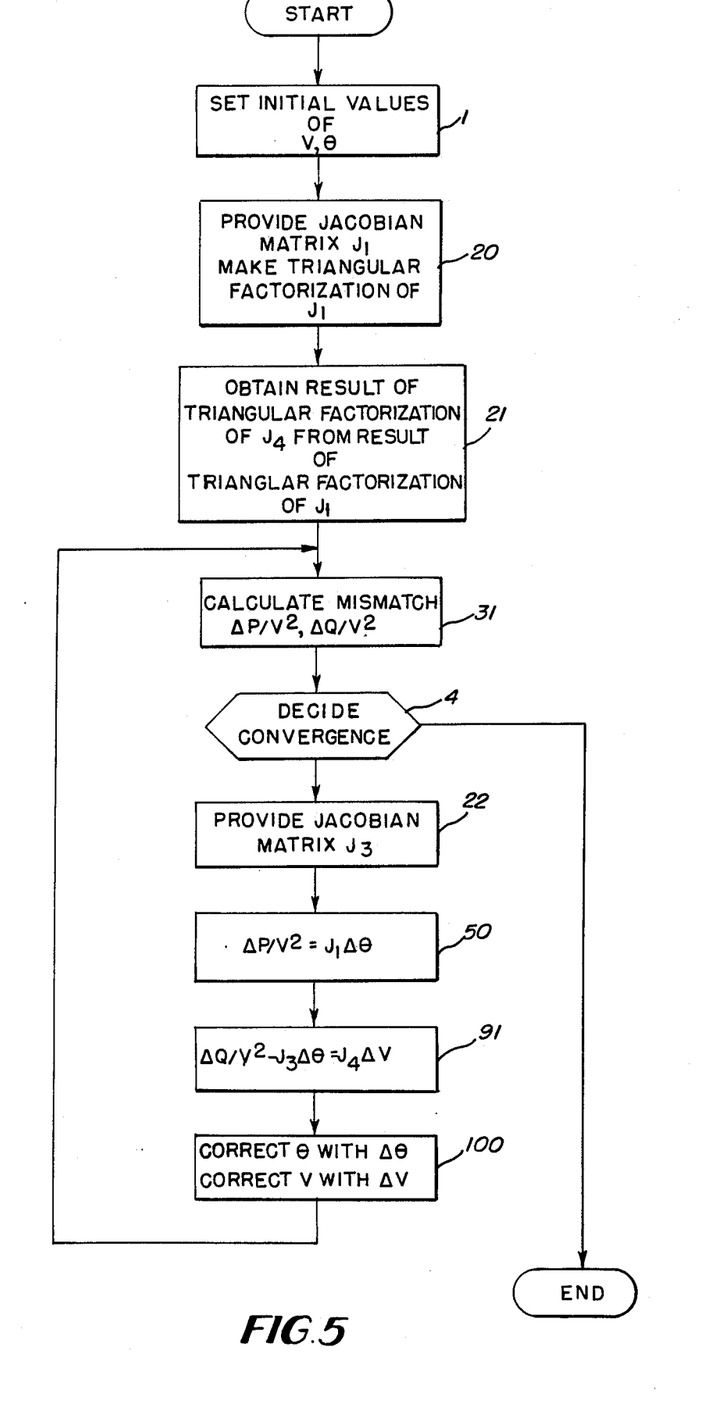
FIG. 5 is a flow chart showing another embodiment of the load flow calculating system according to the present invention.

Next, an embodiment of the present invention will be described with reference to FIG. 5, wherein like or corresponding parts to those in FIG. 1 and FIG. 2 are denoted by like reference numerals. Reference numeral 31 depicts a block which obtains an effective power and a reactive power flowing into each node by using V, $\theta$, further acquires $\Delta P$, $\Delta Q$ that are the differences between these values and the designated value of the effective power and that of the reactive power, flowing into each node, respectively, dividing $\Delta P$, $\Delta Q$ of each node by the square of the voltage V at each node, and thereby calculating $\Delta P/V^2$, $\Delta Q/V^2$.

22 denotes a block to provide Jacobian matrix $J_3$ for reactive power with respect to phase, 91 is a block for obtaining a correction amount $\Delta V$ of the voltage by solving a linear equation $\Delta Q/V^2 - J_3\Delta Q = J_4\Delta V$ with the result of triangular factorization of $J_4$ obtained in block 21, Jacobian matrix $J_3$ for reactive power with respect to phase obtained in block 22, the correction amount of the phase $\Delta\theta$ obtained in block 50, and the mismatch $\Delta Q/V^2$ obtained in block 31, and 100 denotes a block to correct $\theta$ and V with $\Delta\theta$ and $\Delta V$ being obtained in block 50 and block 91.

Next, detailed description of the algorithm for load flow calculation in the embodiment of the invention will be given with reference to points different from the algorithm in FIG. 2.

The method for solving the linear equation which is used in the present invention will be described. The linear equation to be solved in the invention is such as the following equation (11).

$$\begin{pmatrix} \Delta P_{v2} \\ \Delta Q_{v2} \end{pmatrix} = \begin{pmatrix} J_1 & J_2 \\ J_3 & J_4 \end{pmatrix} \begin{pmatrix} \Delta\theta \\ \Delta V \end{pmatrix} \quad (11)$$

where $J_1 = \frac{\partial p}{\partial \theta}$, $J_2 = \frac{\partial p}{\partial V}$ $J_3 = \frac{\partial p}{\partial \theta}$, $J_4 = \frac{\partial p}{\partial V}$ $\Delta\theta$, $\Delta V$: correction amounts of phase and voltage.

Now, from the nature of a power system, it is considered that the voltage of each node is in the vicinity of 1.0 PU and the voltage correction amount is small. In view of this as well as that each element of the Jacobian matrix $J_2$ is smaller than each element of the Jacobian matrix $J_1$, approximate values of the correction amount $\Delta\theta$ of phase and the correction amount $\Delta V$ of voltage in the present invention are obtained by solving equation (12).

$$\begin{pmatrix} \Delta P_{v2} \\ \Delta Q_{v2} \end{pmatrix} = \begin{pmatrix} J_1 & 0 \\ J_3 & J_4 \end{pmatrix} \begin{pmatrix} \Delta\theta \\ \Delta V \end{pmatrix} \quad (12)$$

Consequently, the above mentioned $\Delta\theta$ and $\Delta V$ are given by equations (25).

$$\begin{cases} \Delta\theta = J_1^{-1} \Delta P_{v2} \\ \Delta V = J_4^{-1} (\Delta Q_{v2} - J_3 \Delta\theta) \end{cases} \quad (13)$$

Although, in deriving the Jacobian matrix $J_1$ and $J_4$ in the above embodiment, resistance Rij of the branch was taken into consideration, the Jacobian matrixes $J_1$ and $J_4$ may be provided with such an approximation as Rij=0 introduced. And the correction amounts $\Delta\theta$ and $\Delta V$ of phase and voltage may be used for correction of phase and voltage after being multiplied by some factor (approximately 1.1). According to the present invention, by the introduction of the variables of the discrepancies, from the specified values, of the inflow effective power and inflow reactive power through each node divided by the square of the voltage on each node, the Jacobian matrix for reactive power with respect to voltage is made to be identical with a part of the Jacobian matrix for effective power with respect to phase, and thereby, the need for triangular factorization of the Jacobian matrix for reactive power with respect to voltage is eliminated and the calculation volume for triangular factorization can be half of the volume required in the prior art, so that an effect is obtained that a speed-up of the processing is made achievable. Furthermore, at the time of calculating the voltage correction amount according to the present invention, the voltage correction amount can be compensated by the use of the product of the Jacobian matrix for reactive power with respect to phase and the phase correction amount that has already been calculated, and thereby, it is enabled to obtain the voltage correction amount with precision without the need for a new mismatch calculation, so that there is an effect that speedy processing is made possible.

The present invention is applicable to systems to process load flow calculation for a power system by means of Jacobian matrixes.

What is claimed is:

1. A method of controlling a power system, comprising the steps of:

obtaining on-line data of voltages and phases at nodes of main power buses of the power system, setting an initial control adjustment amount for one or more of the voltages and/or phases, calculating load flow at said nodes of the power system by a decoupled calculation employing a Jacobian matrix for reactive power with respect to voltage and a Jacobian matrix for effective power with respect to phase, and including triangular factorization of the Jacobian matrix for effective power to calculate discrepancy of effective power from specified values through such nodes, deriving triangular factorization of said Jacobian matrix for reactive power from the result of triangular factorization of said Jacobian matrix for effective power, said calculating including introducing variables representing quotients of the discrepancies of the effective power and the reactive power flowing in through each node from specified values divided by the square of the voltage on each node, and using such variables to calculate correction values of phase and voltage for said effective power and reactive power respectively from specified values through each node, by using the triangular factorization of said Jacobian matrices for effective and reactive power, evaluating the calculated load flow, correcting the control adjustment amount with said correction values and repeating the calculating and evaluating steps until the evaluating step indicates a good power system, and effecting a change in the voltages and phases at said nodes of the power system in accordance with the control adjustment amount after the evaluating step finds a good power system.

2. A method of controlling a power system, comprising the steps of:

obtaining on-line data of voltages and phases at nodes of main power buses of the power system, setting an initial control adjustment amount for one or more of the voltages and/or phases, calculating load flow at said nodes of the power system by a decoupled calculation employing a Jacobian matrix for reactive power with respect to voltage and a Jacobian matrix for effective power with respect to phase, and including triangular factorization of the Jacobian matrix for effective power to calculate discrepancy of effective power from specified values through each node, deriving triangular factorization of said Jacobian matrix for reactive power from the triangular factorization of said Jacobian matrix for effective power, said calculating including introducing variables representing the quotients of differences between effective power and reactive power flowing in through each node and specified values divided by the square of the voltage on each said node, calculating a phase correction amount by division of said effective power quotient by said factorized Jacobian matrix for effective power, providing a Jacobian matrix for reactive power with respect to phase, and calculating a voltage correction amount by the use of a product of the Jacobian matrix for reactive power with respect to phase and said calculated phase correction amount, divided by the triangular factorization result of said Jacobian matrix for reactive power with respect to voltage, evaluating the calculated load flow, correcting the control adjustment amount with said voltage and phase correction amounts and repeating the calculating and evaluating steps until the evaluating step indicates a good power system, and effecting a change in the voltages and phases at said nodes of the power system in accordance with the control adjustment amount after the evaluating step finds a good power system.

* * * * *

UNITED STATES PATENT AND TRADEMARK OFFICE
CERTIFICATE OF CORRECTION

PATENT NO. : 4,868,410
DATED : September 19, 1989
INVENTOR(S) : SHIZUKA NAKAMURA It is certified that error appears in the above-identified patent and that said Letters Patent is hereby corrected as shown below:

Front Page, Col. 1, [54], lines 1 and 2, "SYSTEM OF LOAD FLOW CALCULATION FOR ELECTRIC POWER SYSTEM" should be --DOCOUPLED METHOD OF LOAD FLOW CALCULATION USING FIXED SINGLE JACOBIAN MATRIX FOR ELECTRIC POWER SYSTEM CONTROL--;
Front Page, Col. 1, [75], "Kohbe" should be --Hyogo--.
Col. 1, lines 1 and 2, "SYSTEM OF LOAD FLOW CALCULATION FOR ELECTRIC POWER SYSTEM" should be --DECOUPLED METHOD OF LOAD FLOW CALCULATION USING FIXED SINGLE JACOBIAN MATRIX FOR ELECTRIC POWER SYSTEM CONTROL--.
Col. 2, line 12, after "invention" insert --discloses--;
Col. 2, line 13, delete "discloses".
Col. 4, line 60, delete "the" (first occurrence).
Col. 5, line 15, "$\Delta Pv_2$" should be --$\Delta P/V^2$--;
Col. 5, line 16, "$\Delta Qv_2$" should be --$\Delta Q/V^2$--;
Col. 5, line 20, "$\alpha p$" (both occurrences) should be --$\alpha q$--;
Col. 5, line 35, "$\Delta Pv_2$" should be --$\Delta P/V^2$--;
Col. 5, line 36, "$\Delta Qv_2$" should be --$\Delta Q/V^2$--;
Col. 5, line 40, "(25)" should be --(13)--;
Col. 5, line 43, "$\Delta Pv_2$" should be --$\Delta P/V^2$--;
Col. 5, line 45, "$\Delta Qv_2$" should be --$\Delta Q/V^2$--;
Col. 5, line 48, "matrix" should be --matrixes--.

Signed and Sealed this

Sixteenth Day of October, 1990

*Attest:*

HARRY F. MANBECK, JR.

*Attesting Officer*      *Commissioner of Patents and Trademarks*